US008368736B2

(12) United States Patent
Saisho et al.

(10) Patent No.: US 8,368,736 B2
(45) Date of Patent: Feb. 5, 2013

(54) OPTICAL SCANNING DEVICE AND IMAGE FORMING APPARATUS

(75) Inventors: Kenichiro Saisho, Tokyo (JP); Toshiaki Tokita, Kanagawa (JP); Nobuaki Kubo, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 163 days.

(21) Appl. No.: 12/820,746

(22) Filed: Jun. 22, 2010

(65) Prior Publication Data

US 2010/0328417 A1 Dec. 30, 2010

(30) Foreign Application Priority Data

Jun. 30, 2009 (JP) ................................. 2009-155220

(51) Int. Cl.
*B41J 15/14* (2006.01)
*B41J 27/00* (2006.01)

(52) U.S. Cl. ........ 347/259; 347/241; 347/243; 347/256; 347/258; 347/260

(58) Field of Classification Search .................... None
See application file for complete search history.

(56) References Cited

U.S. PATENT DOCUMENTS

| 5,668,590 | A | 9/1997 | Maruo et al. |
|---|---|---|---|
| 6,376,837 | B1 | 4/2002 | Itabashi et al. |
| 7,245,430 | B2 | 7/2007 | Kobayashi et al. |
| 7,301,554 | B2 | 11/2007 | Kubo |
| 7,417,777 | B2 | 8/2008 | Saisho et al. |
| 7,545,547 | B2 | 6/2009 | Hayashi et al. |
| 7,616,364 | B2 | 11/2009 | Saisho et al. |
| 7,663,657 | B2 | 2/2010 | Ichii et al. |
| 7,672,032 | B2 | 3/2010 | Hayashi et al. |
| 7,688,491 | B2 | 3/2010 | Saisho et al. |
| 7,710,445 | B2 | 5/2010 | Amada et al. |
| 2003/0210324 | A1* | 11/2003 | Sung et al. ................. 347/241 |
| 2006/0072201 | A1* | 4/2006 | Shimomura ................ 359/566 |
| 2006/0284968 | A1 | 12/2006 | Hayashi et al. |
| 2007/0211326 | A1 | 9/2007 | Saisho et al. |
| 2007/0216316 | A1 | 9/2007 | Hirano et al. |
| 2007/0253048 | A1 | 11/2007 | Sakai et al. |
| 2008/0123159 | A1 | 5/2008 | Hayashi et al. |
| 2008/0218827 | A1 | 9/2008 | Watanabe et al. |
| 2008/0219601 | A1 | 9/2008 | Arai et al. |
| 2009/0052944 | A1 | 2/2009 | Kubo et al. |
| 2009/0058979 | A1 | 3/2009 | Saisho et al. |
| 2009/0059337 | A1 | 3/2009 | Saisho |
| 2009/0080907 | A1 | 3/2009 | Hagiya et al. |
| 2009/0195636 | A1 | 8/2009 | Arai et al. |

(Continued)

FOREIGN PATENT DOCUMENTS

| JP | 7-144434 A | 6/1995 |
|---|---|---|
| JP | 10-3048 A | 1/1998 |

(Continued)

*Primary Examiner* — Matthew Luu
*Assistant Examiner* — Kendrick Liu
(74) *Attorney, Agent, or Firm* — Dickstein Shapiro LLP

(57) ABSTRACT

An optical scanning device includes four light sources, a pre-deflector optical system, a polygon mirror, an optical scanning system, etc. The optical scanning system includes deflector-side scanning lenses made of glass, imaging-surface-side scanning lenses made of resin, polarized light splitters, and reflecting mirrors. The deflector-side scanning lenses, the imaging-surface-side scanning lenses, the polarized light splitters, and the reflecting mirrors are arranged in this order on an optical path of light going from the polygon mirror toward drum-shaped photosensitive elements.

18 Claims, 14 Drawing Sheets

U.S. PATENT DOCUMENTS

2009/0220256 A1 9/2009 Suhara et al.
2009/0231557 A1 9/2009 Kubo
2010/0060710 A1 3/2010 Kubo
2010/0060963 A1 3/2010 Miyake et al.
2010/0118366 A1 5/2010 Tokita et al.

FOREIGN PATENT DOCUMENTS

JP 3247497 B2 11/2001
JP 2008-70599 A 3/2008

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2009-155220 filed in Japan on Jun. 30, 2009.

BACKGROUND OF THE INVENTION

1. Field of the Invention

The present invention relates to an optical scanning device and an image forming apparatus.

2. Description of the Related Art

In the field of electrophotographic image recording, image forming apparatuses that use lasers as light sources are widely used. Such image forming apparatuses include optical scanning devices that emit light from a light source, deflect the light with a deflector, scan the surface of a drum-shaped photosensitive element with the deflected light (scanning light), and form a latent image on the surface of the photosensitive element.

Multi-color image forming apparatuses have been developed that form an image by superimposing different color images on each other. Tandem-type multi-color image forming apparatuses are particularly widely used as examples of such apparatuses. They form, using a plurality of scanning optical systems, light spots on the surfaces of a plurality of color-based drum-shaped photosensitive elements.

One technology that copes with multi-color image writing uses a plurality of optical scanning devices so that each optical scanning device in the plurality is for a different color; however, using this technology increases the number of necessary parts and makes it difficult to reduce the size of the image forming apparatus.

One technology that solves the above problems uses one optical scanning device that includes a plurality of optical scanning systems. Such an optical scanning device, in general, includes one deflector that receives and deflects a plurality of beams of light of different colors. Each deflected beam of light passes through a corresponding optical scanning system and forms an image on the surface of a corresponding photosensitive element. However, because several sets of optical elements for different colors are arranged near the deflector, it is still difficult to produce an optical scanning device that is sufficiently small.

One technology that can be used to produce an optical scanning device that is sufficiently small uses an optical scanning system that includes a polarized light splitter (polarized light separator) and splits light depending on the light's polarization direction (see, for example, Japanese Patent No. 3247497, Japanese Patent Application Laid-open No. 2008-070599, Japanese Patent Application Laid-open No. H7-144434, and Japanese Patent Application Laid-open No. H10-3048). Using this technology is an effective way to decrease the thickness of an optical scanning device, i.e., the length of the optical scanning device in the rotation axial direction of the deflector. Using this technology is also an effective way to reduce the number of necessary parts because some optical elements within the scanning optical system are shared.

Another technology that is used to produce an optical scanning device that is sufficiently small uses a dynamic active element, such as a spatial modulator. Another technology uses a dichroic mirror and splits light according to various wavelengths. However, the former technology needs an additional circuit to drive the active element, and the latter technology needs different types of light sources in one optical scanning device. Using these technologies is an effective way to reduce the number of optical elements in the scanning optical system; however, the downside is that an expensive element is needed. Therefore, technology that uses a passive element or a polarized light splitter (hereinafter, "polarized-light splitting technology") is preferable.

To produce a slim optical scanning device using the polarized-light splitting technology, an excellent polarized-light splitting characteristic is needed. If a polarized light splitter receives, for example, slightly elliptically polarized light or polarized light with the polarization direction slightly different from the expected polarization direction, the light is not split correctly and part of the light to be output to a first scanning optical system is output to a second scanning optical system.

The beams of light to be split are modulated in accordance with different time-series signals so that image data is written to each surface with the corresponding beam of light. If the polarized-light splitting characteristic is not adequate, part of the image data for the different surfaces to be scanned becomes mixed. For example, when this happens in a multi-color image forming apparatus, the part of the data to be developed with cyan is written to the surface for magenta, which results in an image with color crosstalk.

The degradation of the polarized-light splitting characteristic occurs due to, for example, birefringence peculiar to resin scanning lenses. Although studies on low-birefringence resin materials have been widely conducted, the use of low-birefringence resin scanning-lenses is still difficult in practice due to difficulties in shaping, molding, and efficiently manufacturing the lenses.

One easy solution for avoiding the birefringence phenomenon is to use glass for all the lenses in the scanning optical system. However, to satisfy the current needs for high image quality, it is required to increase the number of lenses and the accuracy of the lens processing, which increase costs.

The problem is that, in the technologies disclosed in Japanese Patent No. 3247497, Japanese Patent Application Laid-open No. 2008-070599, Japanese Patent Application Laid-open No. H7-144434, and Japanese Patent Application Laid-open No. H10-3048, the degradation of the polarized-light splitting characteristics caused by the birefringence peculiar to resin scanning lenses is not taken into consideration.

SUMMARY OF THE INVENTION

It is an object of the present invention to at least partially solve the problems in the conventional technology.

According to an aspect of the present invention, there is provided an optical scanning device that deflects, by using a deflector, a first beam of light polarized in a given direction and a second beam of light polarized in a direction perpendicular to the given direction and guides each of the first beam of light and the second beam of light to a corresponding surface to be scanned by using an optical scanning system so that each light forms an image on the corresponding surface. The optical scanning system includes a first scanning lens that is arranged on an optical path along which light travels after being deflected by the deflector, wherein the first scanning lens is made of glass; a second scanning lens that is arranged on an optical path along which light travels after passing through the first scanning lens, wherein the second scanning lens is made of resin; and a polarized light splitter that is arranged on an optical path along which light travels after passing through the second scanning lens, wherein the polarized light splitter allows the first beam of light to pass therethrough and reflects the second beam of light.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
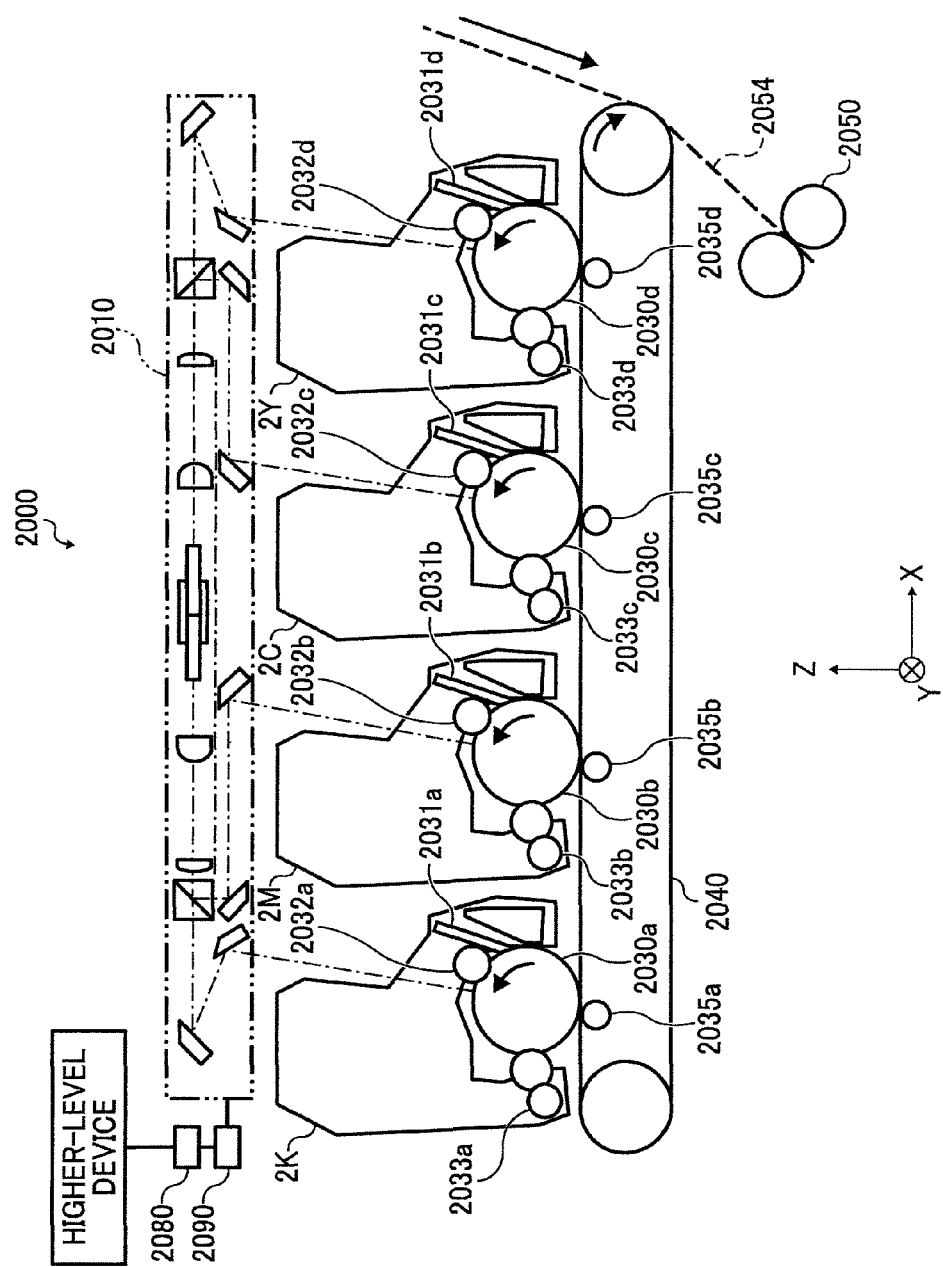
FIG. 1 is a schematic diagram of the configuration of a color printer according to an embodiment of the present invention.

Exemplary embodiments of the present invention are described in detail below with reference to FIGS. 1 to 21. FIG. 1 is a schematic diagram of a color printer 2000. The color printer 2000 is used as an image forming apparatus according to an embodiment of the present invention.

The color printer 2000 is a tandem-type multi-color printer that forms a full-color image by superimposing four color images (a black image, a cyan image, a magenta image, and a yellow image) on each other. The color printer 2000 includes, for example, an optical scanning device 2010; four drum-shaped photosensitive elements 2030a, 2030b, 2030c, and 2030d; four cleaning devices 2031a, 2031b, 2031c, and 2031d; four charging rollers 2032a, 2032b, 2032c, and 2032d; four developing devices 2033a, 2033b, 2033c, and 2033d; four transfer rollers 2035a, 2035b, 2035c, and 2035d; an intermediate transfer belt 2040; a fixing device 2050; a paper conveyer path 2054; a communication control device 2080; a printer control device 2090 that controls the above-described units.

It is assumed that, in the three-dimensional (XYZ) orthogonal coordinate system, the longitudinal direction of each photosensitive element corresponds to the Y-axis direction; and the alignment direction of the four photosensitive elements corresponds to the X-axis direction.

The communication control device 2080 controls mutual communications between the color printer 2000 and a higher-level device (e.g., a personal computer) connected to the color printer 2000 via a network or the like.

Each of the photosensitive elements has the surface with a photosensitive layer being formed thereon. It means that the surface of each photosensitive element is the surface to be scanned. Each photosensitive element is rotated by a rotating mechanism (not shown) in the direction indicated by the arrow shown in FIG. 1.

Near the surface of the photosensitive element 2030a, the charging roller 2032a, the developing device 2033a, the transfer roller 2035a, and the cleaning device 2031a are arranged in the rotating direction of the photosensitive element 2030a.

The photosensitive element 2030a, the charging roller 2032a, the developing device 2033a, the transfer roller 2035a, and the cleaning device 2031a together form an image forming station for black images (hereinafter, "K station") and they operate as a unit.

Near the surface of the photosensitive element 2030b, the charging roller 2032b, the developing device 2033b, the transfer roller 2035b, and the cleaning device 2031b are arranged in the rotating direction of the photosensitive element 2030b.

The photosensitive element 2030b, the charging roller 2032b, the developing device 2033b, the transfer roller 2035b, and the cleaning device 2031b together form an image forming station for magenta images (hereinafter, "M station") and they operate as a unit.

Near the surface of the photosensitive element 2030c, the charging roller 2032c, the developing device 2033c, the transfer roller 2035c, and the cleaning device 2031c are arranged in the rotating direction of the photosensitive element 2030c.

The photosensitive element 2030c, the charging roller 2032c, the developing device 2033c, the transfer roller 2035c, and the cleaning device 2031c together form an image forming station for cyan images (hereinafter, "C station") and they operate as a unit.

Near the surface of the photosensitive element 2030d, the charging roller 2032d, the developing device 2033d, the transfer roller 2035d, and the cleaning device 2031d are arranged in the rotating direction of the photosensitive element 2030d.

The photosensitive element 2030d, the charging roller 2032d, the developing device 2033d, the transfer roller 2035d, and the cleaning device 2031d together form an image forming station for yellow images (hereinafter, "Y station") and they operate as a unit.

Each charging device charges the surface of the corresponding photosensitive element evenly.

The optical scanning device 2010 illuminates the charged surface of the corresponding photosensitive element with light that is modulated in accordance with the corresponding-colored image data (black image data, cyan image data, magenta image data, or yellow image data) that has been received from the higher-level device. As a result of the scanning, part of the surface of the photosensitive element exposed to the light is discharged and, thus, a latent image is formed on the surface of the photosensitive element on the basis of the image data. The formed latent image moves toward the corresponding developing roller by rotation of the photosensitive element. The configuration of the optical scanning device 2010 will be described later.

Each developing device develops the latent image formed on the surface of the corresponding photosensitive element with toners into a visible image. The visible image (toner image) moves toward the intermediate transfer belt 2040 by rotation of the photosensitive element.

Each transfer roller is used to transfer the toner image from the surface of the corresponding photosensitive element to the intermediate transfer belt 2040. The toner images including the black toner image, the magenta toner image, the cyan toner image, and the yellow toner image are superimposed on each other on the intermediate transfer belt 2040.

The printer control device 2090 feeds a recording sheet from a paper-feed tray (not shown) and conveys the recording sheet to the intermediate transfer belt 2040 along the paper conveyer path 2054 at a predetermined point of time. The toner image is then transferred from the intermediate transfer belt 2040 onto the recording sheet. The recording sheet with the toner image is then conveyed to the fixing device 2050.

Heat and pressure is applied to the recording sheet using the fixing device 2050 and the toner is fixed onto the recording sheet. The recording sheet with the toner fixed thereon is conveyed and stacked onto a discharge tray (not shown).

Each cleaning device removes toners (residual toners) from the surface of the corresponding photosensitive element. After the residual toners are removed from the surface of the photosensitive element, the surface with no residual toners rotates back to the position opposite to the corresponding charging device.

The configuration of the optical scanning device 2010 is described below.

Figure 2:
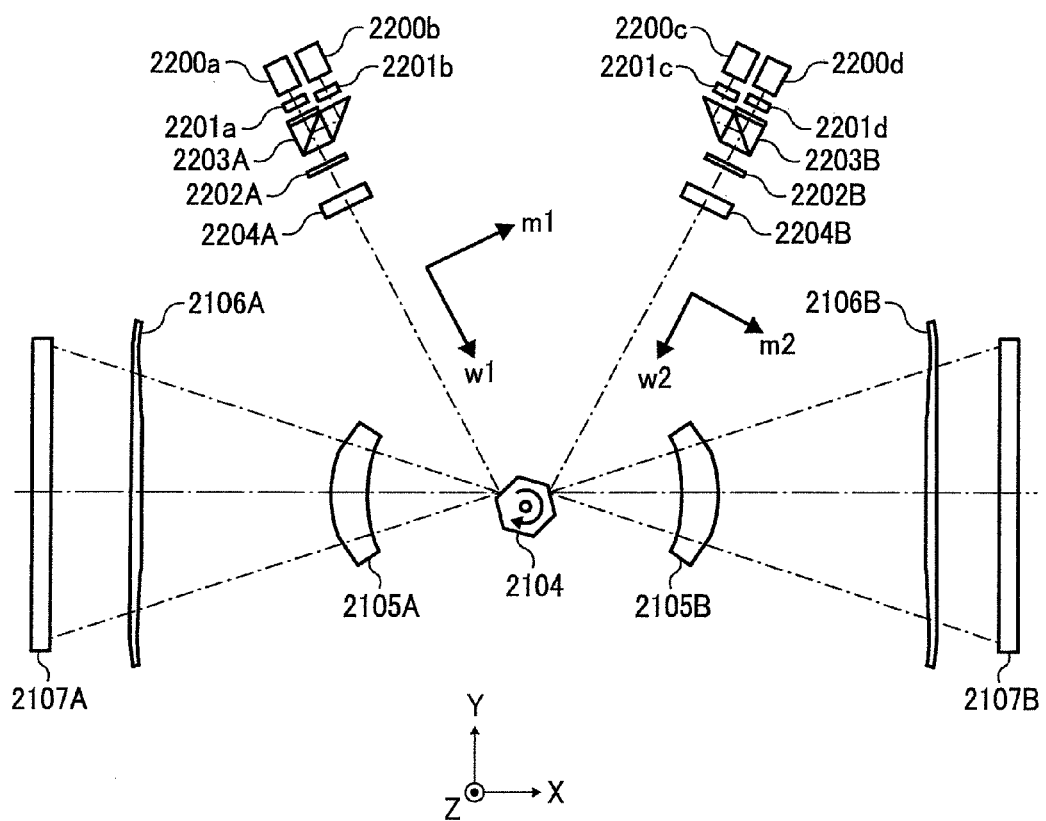
FIG. 2 is a first schematic diagram of the configuration of an optical scanning device shown in FIG. 1.
Figure 3:
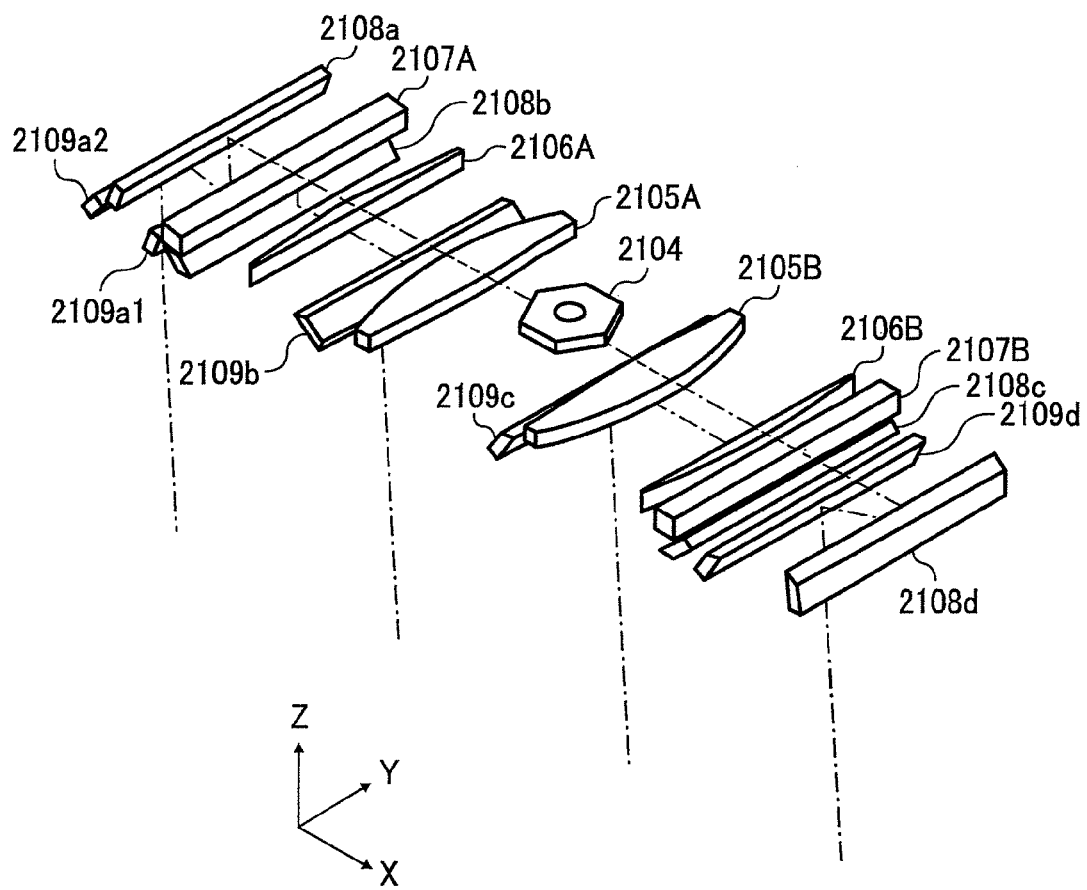
FIG. 3 is a second schematic diagram of the configuration of the optical scanning device shown in FIG. 1.
Figure 4:
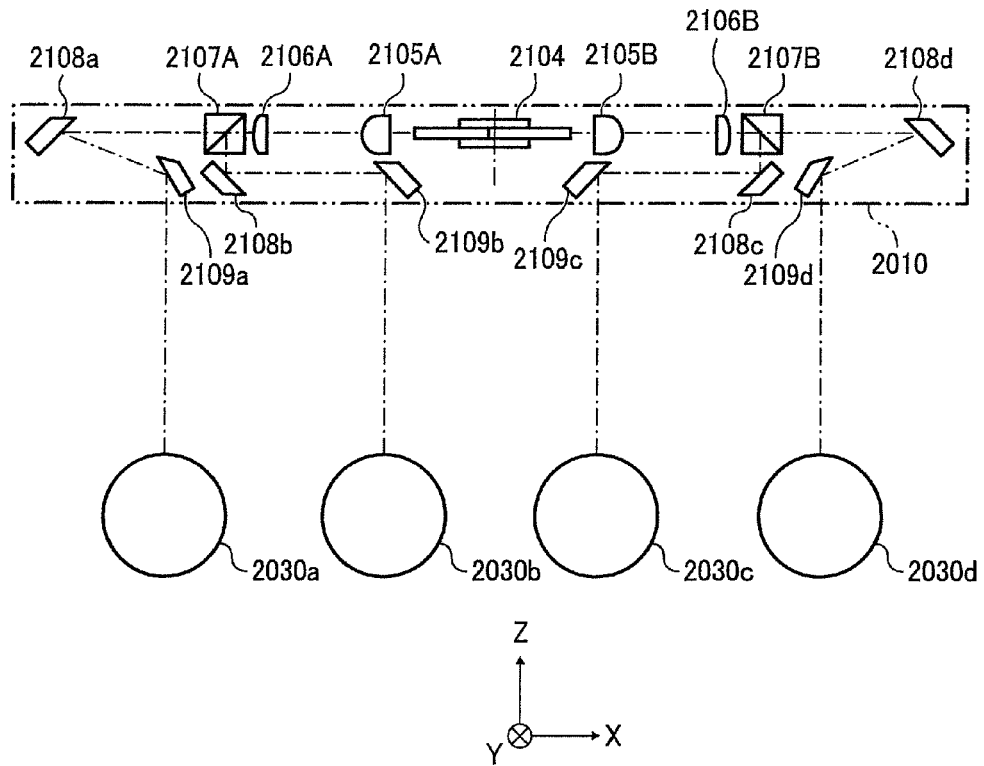
FIG. 4 is a third schematic diagram of the configuration of the optical scanning device shown in FIG. 1.

As shown in FIGS. 2 to 4, the optical scanning device 2010 includes, for example, four light sources 2200a, 2200b, 2200c, and 2200d; four coupling lenses 2201a, 2201b, 2201c, and 2201d; two apertures 2202A and 2202B; two couplers 2203A and 2203B; two cylindrical lenses 2204A and 2204B; a polygon mirror 2104; two deflector-side scanning lenses 2105A and 2105B; two imaging-surface-side scanning lenses 2106A and 2106B; two polarized-light splitters 2107A and 2107B; nine reflecting mirrors 2108a, 2108b, 2108c, 2108d, 2109a1, 2109a2, 2109b, 2109c, and 2109d; and a scanning control device (not shown). These components are fixed at predetermined positions of an optical-system housing (not shown).

Hereinafter, the direction corresponding to the main-scanning direction is called "main-scanning corresponding direction" and the direction corresponding to the sub-scanning direction is called "sub-scanning corresponding direction". The two reflecting mirrors 2109a1 and 2109a2 are called "one reflecting mirror 2109a", collectively.

The direction in which the light sources 2200a and 2200b emit light is called "direction w1"; and the main-scanning corresponding direction at the light sources 2200a and 2200b is called "direction m1". The direction in which the light sources 2200c and 2200d emit light is called "direction w2"; and the main-scanning corresponding direction at the light sources 2200c and 2200d is called "direction m2". Both the sub-scanning corresponding direction at the light sources 2200a and 2200b and the sub-scanning corresponding direction at the light sources 2200c and 2200d are parallel to the Z-axis direction.

Figure 5:
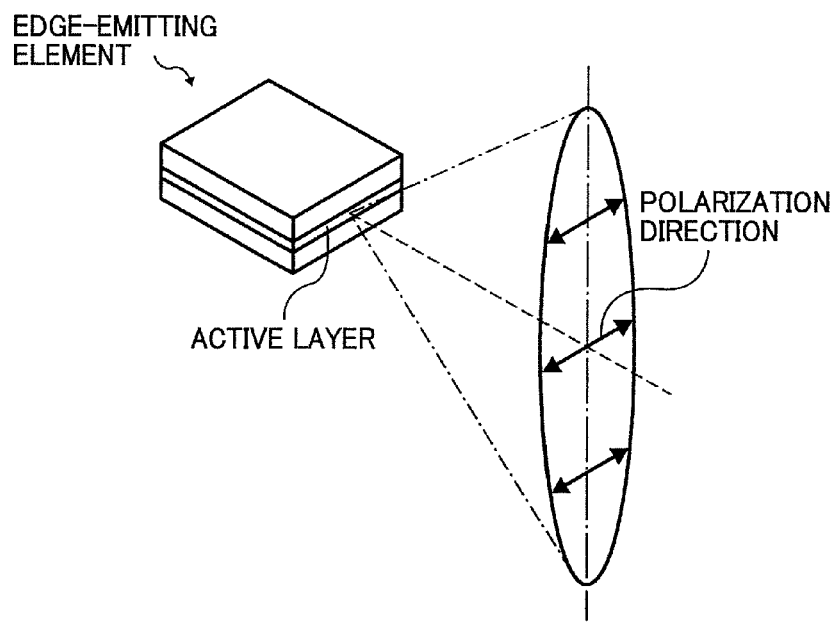
FIG. 5 is a schematic diagram that explains an edge-emitting element.

Each light source is a semiconductor laser that includes a typical edge-lighting element, which is made of a p-type semiconductor material and an n-type semiconductor material, covered with a metal or similar. The edge-lighting element has, typically, a double heterostructure with a heterojunction between the p-type semiconductor material and the n-type semiconductor material. When a current is applied to the heterojunction, laser light emits from an active layer that is formed at the heterojunction. It is known that laser light emitted from a light source having such a configuration is, in general, polarized light with the polarization direction parallel to the active layer as shown in FIG. 5.

Referring back to FIG. 2, the light source 2200a is adjacent to the light source 2200b; the light source 2200d is adjacent to the light source 2200c. The light sources 2200b and 2200c are away from each other in the X-axis direction.

The light emitted from the light source 2200a is called "light LBa"; the light emitted from the light source 2200b is called "light LBb"; the light emitted from the light source 2200c is called "light LBc"; and the light emitted from the light source 2200d is called "light LBd".

The coupling lens 2201a is arranged at the +w1 side of the light source 2200a. The coupling lens 2201a outputs the light LBa to the subsequent optical system as any of parallel light, convergent light, and divergent light.

The coupling lens 2201b is arranged at the +w1 side of the light source 2200b. The coupling lens 2201b outputs the light LBb to the subsequent optical system as any of parallel light, convergent light, and divergent light.

The coupling lens 2201c is arranged at the +w2 side of the light source 2200c. The coupling lens 2201c outputs the light LBc to the subsequent optical system as any of parallel light, convergent light, and divergent light.

The coupling lens 2201d is arranged at the +w2 side of the light source 2200d. The coupling lens 2201d outputs the light LBd to the subsequent optical system as any of parallel light, convergent light, and divergent light.

Each coupler converts two beams of light into beams of linearly polarized light perpendicular to each other and outputs the beams of linearly polarized light onto the same optical path.

The coupler 2203A is arranged at the w1 side of the coupling lenses 2201a and 2201b.

The coupler 2203B is arranged at the w2 side of the coupling lenses 2201c and 2201d.

Figure 6:
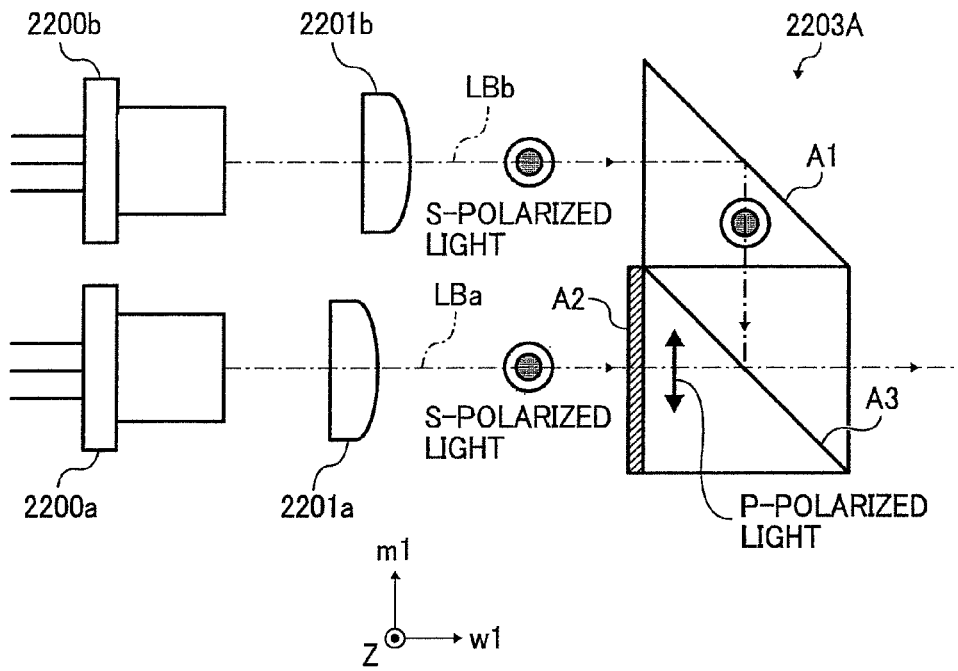
FIG. 6 is a schematic diagram that explains a coupler 2203A.

As shown in FIG. 6, the coupler 2203A includes a reflecting surface A1, an λ/2 wave plate A2, and a polarized-light splitting surface A3. The reflecting surface A1 is on the optical path of the light output from the coupling lens 2201b and bends the optical path of the light toward the −m1 direction. The λ/2 wave plate A2 is on the optical path of the light output from the coupling lens 2201a and rotates the polarization direction of the light 90°. The polarized-light splitting surface A3 is at the −m1 side of the reflecting surface A1 and at the +w1 side of the λ/2 wave plate A2. The polarized-light splitting surface A3 allows p-polarized light to pass therethrough and reflects s-polarized light, which is perpendicular to p-polarized light. The polarized-light splitting surface A3 is made of, for example, a plurality of dielectric layers or a wire grid layer in the same manner as in the widely used polarized-light splitting surface.

Each of the light sources 2200a and 2200b emits linearly polarized light with the polarization direction perpendicular to the sheet surface of FIG. 6. It is noted that the linearly s-polarized light has the polarization direction perpendicular to the plane of incidence (plane defined by the input beam and the output beam) of the polarized-light splitting surface A3, and the linearly p-polarized light has the polarization direction parallel to the plane of incidence.

The s-polarized light LBa emitted from the light source 2200a passes through the coupling lens 2201a and then enters the λ/2 wave plate A2. When passed through the λ/2 wave plate A2, the s-polarized light LBa is converted to the p-polarized light, and the p-polarized light LBa passes through the polarized-light splitting surface A3. The s-polarized light LBb emitted from the light source 2200b passes through the coupling lens 2201b. After that, the s-polarized light LBb is reflected by the reflecting surface A1 toward the −m1 direction and then reflected by the polarized-light splitting surface A3. In this manner, the coupler 2203A outputs the s-polarized light and the p-polarized light on the same optical path.

The length of the optical path of the light LBa within the coupler 2203A is different from the length of the optical path of the light LBb. Therefore, the position of at least one of the coupling lenses 2201a and 2201b is adjusted depending on the difference between the lengths of the optical paths within the coupler 2203A so that the light LBa and the light LBb form images at the same position. In other words, the coupling lens 2201a is not aligned with the coupling lens 2201b in the w1 direction.

Figure 7:
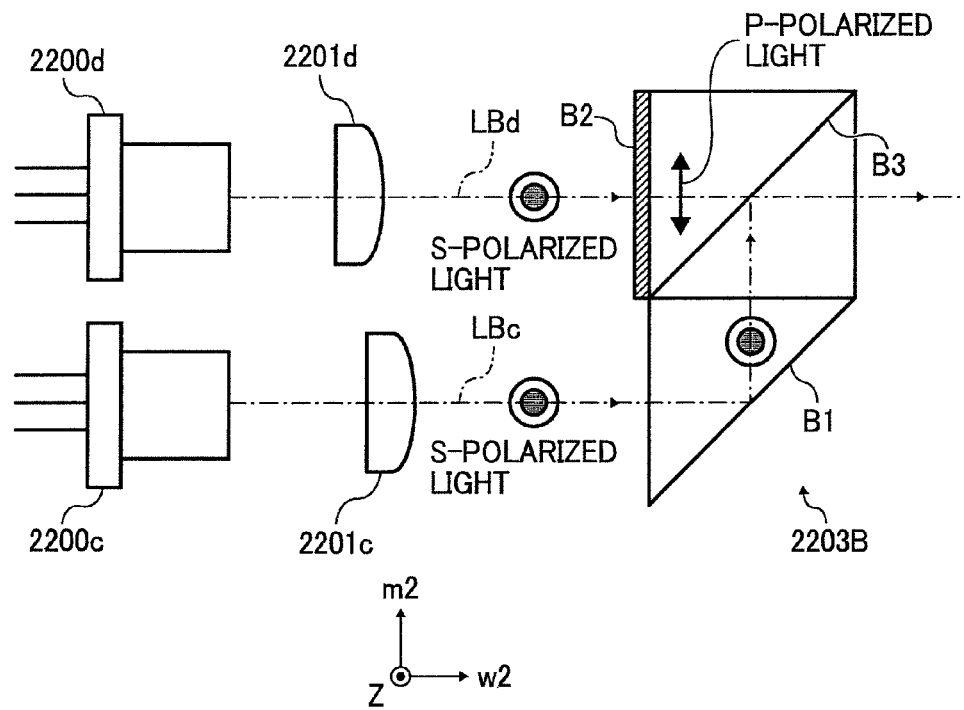
FIG. 7 is a schematic diagram that explains a coupler 2203B.

As shown in FIG. 7, the coupler 2203B includes a reflecting surface B1, an λ/2 wave plate B2, and a polarized-light splitting surface B3. The reflecting surface B1 is on the optical path of the light output from the coupling lens 2201c and bends the optical path of the light toward the +m2 direction. The λ/2 wave plate B2 is on the optical path of the light output from the coupling lens 2201d and rotates the polarization direction of the light 90°. The polarized-light splitting surface B3 is at the +m2 side of the reflecting surface B1 and at the +w2 side of the λ/2 wave plate B2. The polarized-light splitting surface B3 allows p-polarized light to pass therethrough and reflects s-polarized light, which is perpendicular to p-polarized light.

Each of the light sources 2200c and 2200d emits linearly polarized light with the polarization direction perpendicular to the sheet surface of FIG. 7. The linearly s-polarized light has the polarization direction perpendicular to the plane of incidence (plane defined by the input beam and the output beam) of the polarized-light splitting surface B3. The linearly p-polarized light has the polarization direction parallel to the plane of incidence.

The s-polarized light LBd emitted from the light source 2200d passes through the coupling lens 2201d and then enters the λ/2 wave plate B2. When passed through the λ/2 wave plate B2, the s-polarized light LBd is converted to the p-polarized light, and the p-polarized light LBd passes through the polarized-light splitting surface B3. The s-polarized light LBc emitted from the light source 2200c passes through the coupling lens 2201c. After that, the s-polarized light LBc is reflected by the reflecting surface B1 toward the +m2 direction and then reflected by the polarized-light splitting surface B3. In this manner, the coupler 2203B outputs the s-polarized light and the p-polarized light on the same optical path.

It is noted that the coupler can be modified in any manner as long as the coupler converts two beams of light into beams of linearly polarized light perpendicular to each other and outputs the beams of linearly polarized light onto the same optical path. For example, the λ/2 wave plate can be arranged at a different position.

Referring back to FIG. 2, the aperture 2202A has an opening. The aperture 2202A is on the optical path of light output from the coupler 2203A and shapes the light.

The aperture 2202B has an opening. The aperture 2202B is on the optical path of light output from the coupler 2203B and shapes the light.

The cylindrical lens 2204A receives light passed through the opening of the aperture 2202A and outputs the light so that the light forms an image near a deflecting/reflecting surface of the polygon mirror 2104 in the Z-axis direction.

Figure 8:
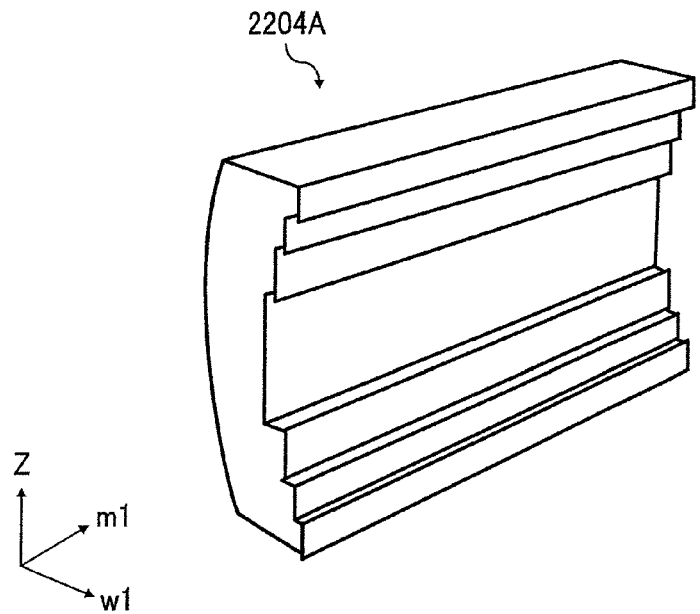
FIG. 8 is a schematic diagram that explains a diffraction lens.

As shown in FIG. 8, the cylindrical lens 2204A is, for example, a diffraction lens that has both a cylindrical surface and a diffraction surface. The light enters from the cylindrical surface and exits from the diffraction surface. With the strong anti-dispersive characteristic of the diffraction surface, the cylindrical lens 2204A can correct, using a change in the light wavelength, a focus shift on the photosensitive element caused by a change in the temperature of the optical scanning device.

Referring back to FIG. 2, the cylindrical lens 22043 receives light passed through the opening of the aperture 2202B and outputs the light so that the light forms an image near a deflecting/reflecting surface of the polygon mirror 2104 in the Z-axis direction. The cylindrical lens 2204B is a diffraction lens that has the same configuration the cylindrical lens 2204A has.

An optical system between the light source and the polygon mirror 2104 on the optical path is called "pre-deflector optical system". The pre-deflector optical system according to the present embodiment includes the four coupling lenses 2201a, 2201b, 2201c, and 2201d, the two apertures 2202A and 2202B, the two couplers 2203A and 2203B, and the two cylindrical lenses 2204A and 2204B.

The polygon mirror 2104 is made up of a single layer that has six side mirrors each working as a deflecting/reflecting surface.

The polygon mirror 2104 deflects the light (LBa and LBb) coming from the cylindrical lens 2204A toward the −X direction and deflects the light (LBc and LBd) coming from the cylindrical lens 2204B toward the +X direction.

The deflector-side scanning lens 2105A is arranged at the −X side of the polygon mirror 2104; and the deflector-side scanning lens 2105B is arranged at the +X side of the polygon mirror 2104.

The deflector-side scanning lenses are made of optical glass, for example, BK-7 glass.

The distance between the rotation axis of the polygon mirror 2104 and the input surface of each deflector-side scanning lens is 36 mm.

The input surface of each deflector-side scanning lens is a rotationally symmetric sphere with the curvature radius −43.1 mm. The output surface of each deflector-side scanning lens is a rotationally symmetric sphere with the curvature radius −32.9 mm. The curvature radius is positive if the center of curvature is at the photosensitive-element side of the optical surface. The curvature radius is negative if the center of curvature is at the polygon-mirror side of the optical surface.

Figure 9:
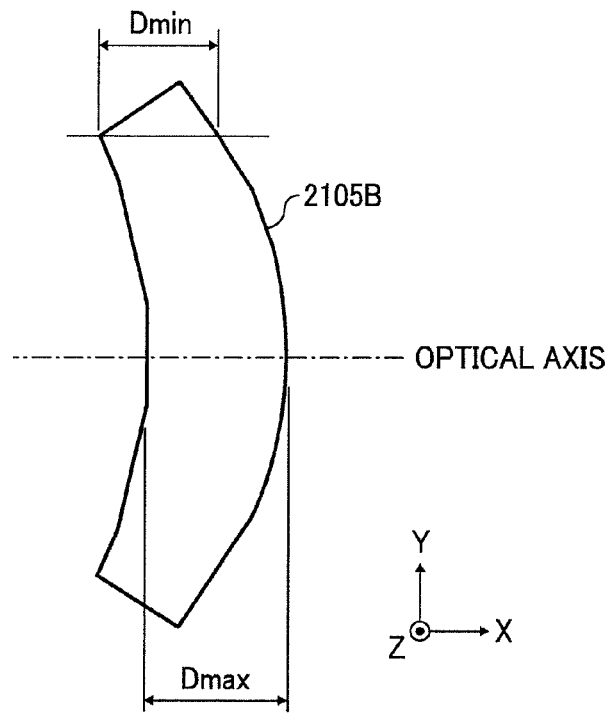
FIG. 9 is a schematic diagram that explains the thickness variance of a deflector-side scanning lens.

The maximum thickness Dmax of each deflector-side scanning lens in the X-axis direction is 10.5 mm; and the minimum thickness Dmin is 8.6 mm (see FIG. 9). If the difference between Dmax and Dmin is called "thickness variance", the thickness variance of each deflector-side scanning lens is 1.9 mm.

The refractive index of each deflector-side scanning lens is 1.56. The focal point distance is, if calculated using the curvature radius, 184 mm. That is, the power of each deflector-side scanning lens is 0.005.

The imaging-surface-side scanning lens 2106A is arranged at the −X side of the deflector-side scanning lens 2105A. The imaging-surface-side scanning lens 2106B is arranged at the +X side of the deflector-side scanning lens 2105B.

Each imaging-surface-side scanning lens is made of optical plastic with a high transparency (for example, "ZEONEX" produced by ZEON Corporation). A lens made of a low birefringence material, such as TOPAS produced by TOPAS Advanced Polymers and OPTOREZ produced by Hitachi Chemical Co., Ltd.), is more preferable.

The distance between the output surface of the deflector-side scanning lens 2105A and the input surface of the imaging-surface-side scanning lens 2106A is 49.1 mm. The distance between the output surface of the deflector-side scanning lens 2105B and the input surface of the imaging-surface-side scanning lens 2106B is also 49.1 mm.

The input surface of each imaging-surface-side scanning lens is an anamorphic surface with the curvature radius 1708 mm. The output surface of each imaging-surface-side scanning lens is an anamorphic surface with the curvature radius 4970 mm. At least one of the input surface and the output surface is designed in such a manner that if an imaginary line is drawn by joining together the centers of curvature of a plurality of XY cross-sections, the imaginary line is not a straight line on an XZ plane. The thickness of each imaging-surface-side scanning lens at the optical axis is 3.5 mm.

Figure 10:
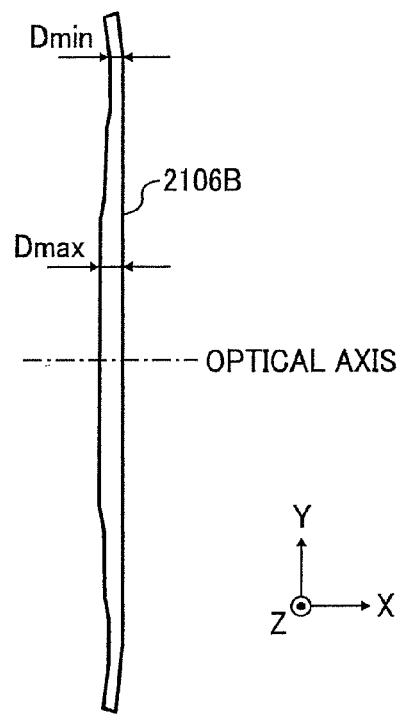
FIG. 10 is a schematic diagram that explains the thickness variance of an imaging-surface-side scanning lens.

The maximum thickness Dmax of each imaging-surface-side scanning lens in the X-axis direction is 1.6 mm; and the minimum thickness Dmin is 1.3 mm (see FIG. 10). The thickness variance of each imaging-surface-side scanning lens is 0.3 mm.

The refractive index of each imaging-surface-side scanning lens is 1.52. The focal point distance is, if calculated using the curvature radius, 5000 mm. That is, the power of each imaging-surface-side scanning lens is 0.0002.

The thickness variance and the power of each imaging-surface-side scanning lens are smaller than the thickness variance and the power of each deflector-side scanning lens, respectively.

The polarized-light splitter 2107A is arranged at the −X side of the imaging-surface-side scanning lens 2106A. The polarized-light splitter 2107E is arranged at the +X side of the imaging-surface-side scanning lens 2106B. Each polarized-light splitter has a splitting surface that allows p-polarized light to pass therethrough and reflects s-polarized light.

Figure 11:
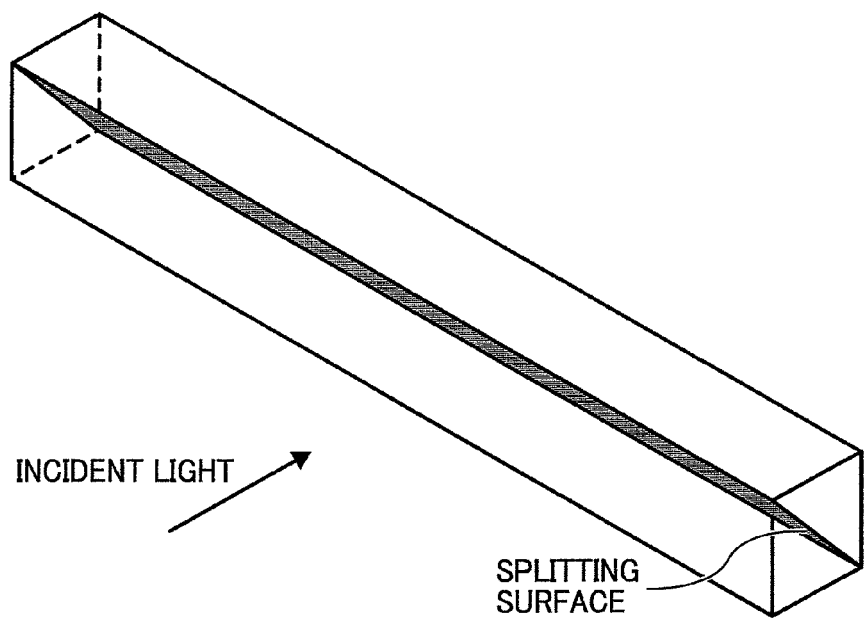
FIG. 11 is a schematic diagram that explains a polarized light splitter.

As shown in FIG. 11, each polarized-light splitter is, for example, produced by joining two long triangular prisms made of glass together with their dielectric multilayer sides being bonded to each other. The bonded surface corresponds to the splitting surface. The triangular prisms are made of optical glass that is selected appropriately from the perspective of the productive efficient of the polarized-light splitters. The dielectric multilayer is designed so as to split the polarized light properly depending on the wavelength of the light.

The distance between the output surface of the imaging-surface-side scanning lens 2106A and the input surface of the polarized-light splitter 2107A is 5 mm. The distance between the output surface of the imaging-surface-side scanning lens 2106B and the input surface of the polarized-light splitter 2107B is also 5 mm.

Figure 12:
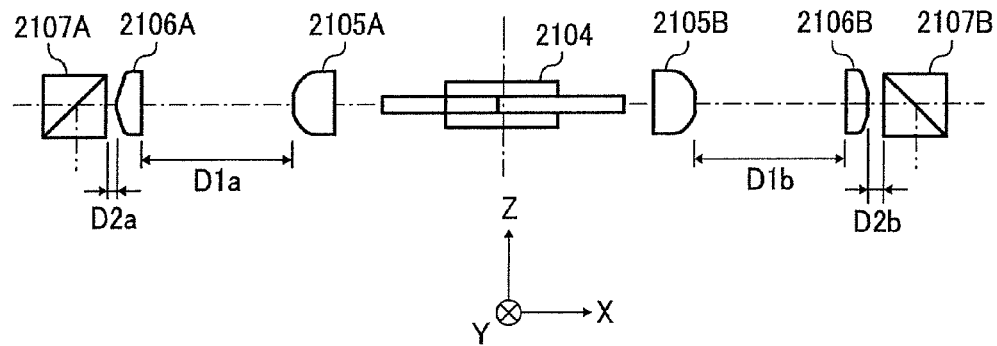
FIG. 12 is a schematic diagram that explains the relation between the distance between an output surface of the deflector-side scanning lens and an input surface of the imaging-surface-side scanning lens and the distance between an output surface of the imaging-surface-side scanning lens and an input surface of the polarized light splitter.

If the distance between the output surface of the deflector-side scanning lens 2105A and the input surface of the imaging-surface-side scanning lens 2106A is $D1a$, and the distance between the output surface of the imaging-surface-side scanning lens 2106A and the input surface of the polarized-light splitter 2107A is $D2a$, then $D1a > D2a$ (see FIG. 12). If the distance between the output surface of the deflector-side scanning lens 2105E and the input surface of the imaging-surface-side scanning lens 2106B is $D1b$, and the distance between the output surface of the imaging-surface-side scanning lens 2106B and the input surface of the polarized-light splitter 2107B is $D2b$, then $D1b > D2b$ (see FIG. 12). It is assumed, herein, that $D1a = D1b$ and $D2a = D2b$.

The length of the polarized-light splitter 2107A in the Y-axis direction is shorter than the length of the imaging-surface-side scanning lens 2106A (see FIG. 2). The length of the polarized-light splitter 2107B in the Y-axis direction is also shorter than the length of the imaging-surface-side scanning lens 2106B. In this case, light does not pass through portions near the both edges in the longitudinal direction of each imaging-surface-side scanning lens where birefringence is likely to occur.

Figure 13:
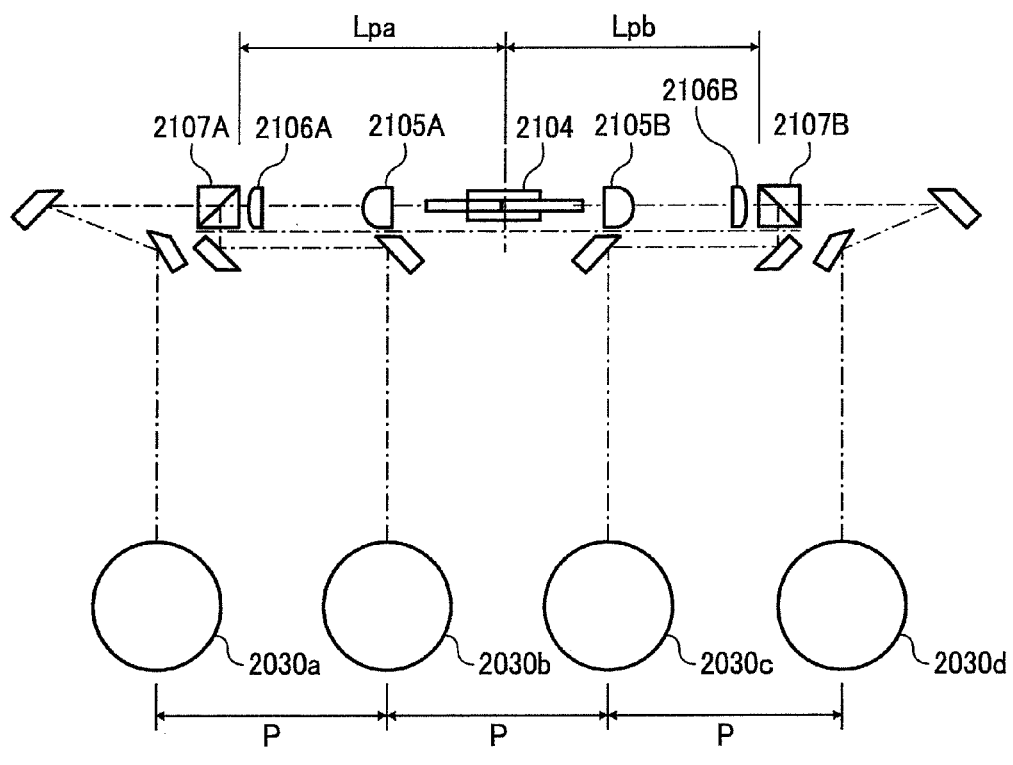
FIG. 13 is a schematic diagram that explains the relation between the distance between the rotation axis of a polygon mirror and the input surface of the polarized light splitter and the distance between the axes of a plurality of photosensitive elements.

Both the distance Lpa between the rotation axis of the polygon mirror 2104 and the input surface of the polarized-light splitter 2107A and the distance Lpb between the rotation axis of the polygon mirror 2104 and the input surface of the polarized-light splitter 2107E are 103.6 mm (see FIG. 13). The inter-axes distance P between the axes of the plurality of the photosensitive elements is, in general, from 60 mm to 100 mm. Therefore, the distances Lpa and Lpb are substantially equal to or longer than the inter-axes distance P.

The relation between the distance Lp, which is the distance between the rotation axis of the deflector and the splitting surface of the polarized-light splitter, and the inter-axes distance P of the photosensitive elements is described below with reference to FIGS. 14 to 18, in which the relation is observed, for a symmetrical optical scanning system, when the length of the optical path from the deflector to the each individual photosensitive element is equal. It is noted that the symmetrical optical scanning system includes two light-optical scanning systems arranged symmetrically in the rotation axis of the deflector. In the following examples, the optical scanning systems that scan the surfaces of four photosensitive elements share one deflector. Although, to make the drawings simpler, the scanning lenses and the light guiding elements are not shown, a light guiding element is arranged at each bending point of the optical path. To make the description simpler, the angle at each bending point of the optical path is set to 90°. Because the incident angle to the surface of each photosensitive element does not directly affect the layout, the incident angle is set to 0°.

1. If Lp<p

Figure 14:
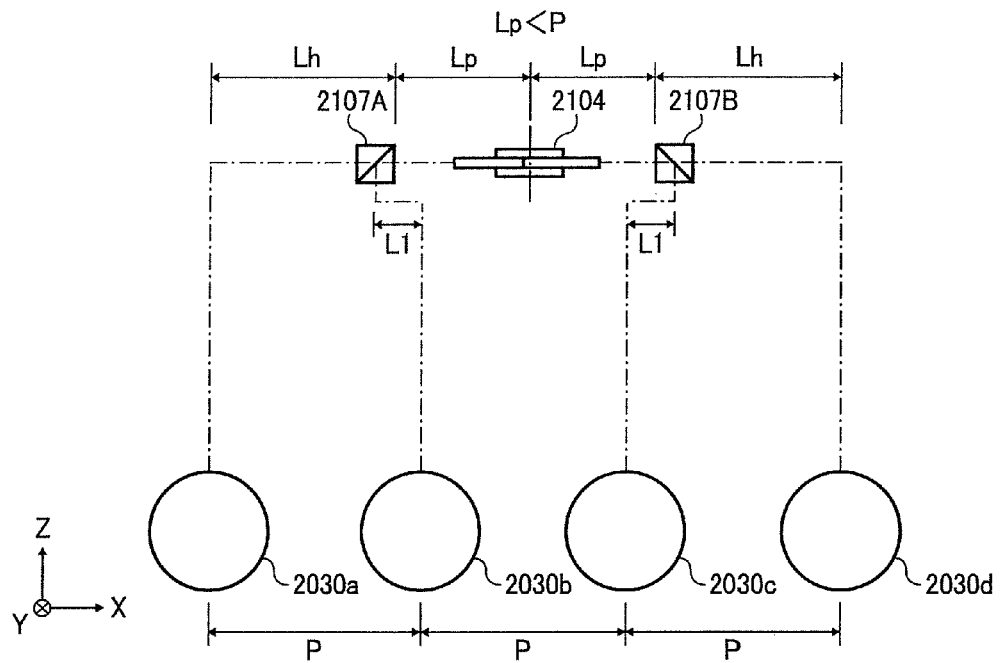
FIG. 14 is a first schematic diagram that explains a case where the distance between the rotation axis of the polygon mirror and the input surface of the polarized light splitter is shorter than the distance between the axes of the plurality of the photosensitive elements.
Figure 15:
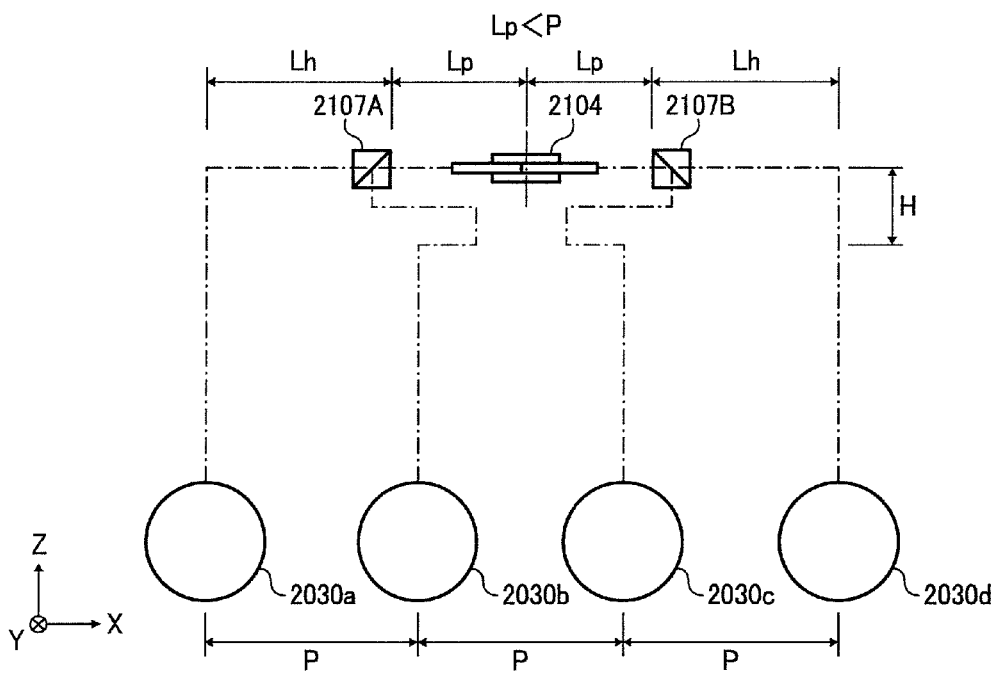
FIG. 15 is a second schematic diagram that explains the case where the distance between the rotation axis of the polygon mirror and the input surface of the polarized light splitter is shorter than the distance between the axes of the plurality of the photosensitive elements.

In the example shown in FIG. 14, it is necessary to increase the portion L1 so as to set the lengths of the optical paths to equal. If the inter-axes distance P and the incident angle to the surface of each photosensitive element cannot be changed, then the inside optical paths are bent inward, for example, as shown in FIG. 15. This disadvantageously increases the thickness H of the optical scanning device.

2. If Lp=P

Figure 16:
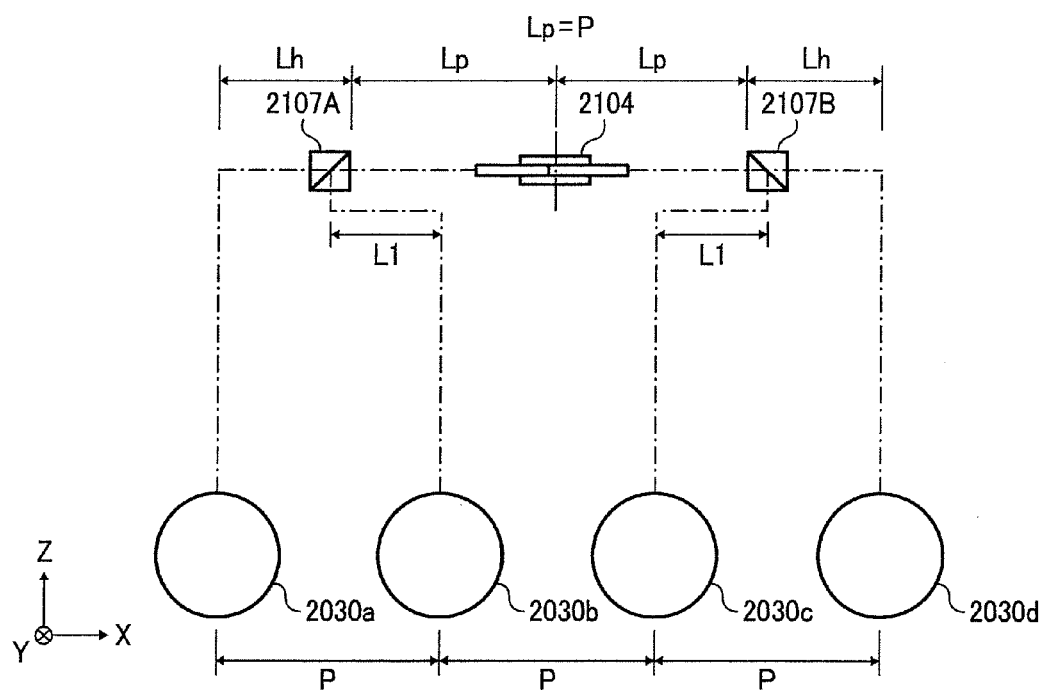
FIG. 16 is a schematic diagram that explains a case where the distance between the rotation axis of the polygon mirror and the input surface of the polarized light splitter is equal to the distance between the axes of the plurality of the photosensitive elements.

In the example shown in FIG. 16, because Lh=L1, it is unnecessary to increase the portion L1. However, in this example, because the optical length in the optical scanning system is determined depending on the inter-axes distance P, the degree of freedom in layout designing is not improved. Moreover, because the deflector-side scanning lens and the imaging-surface-side scanning lens are arranged on the portion with the distance Lp, the optical scanning system may has a disadvantage in aberration correction depending on the inter-axes distance P.

3. If Lp>P

Figure 17:
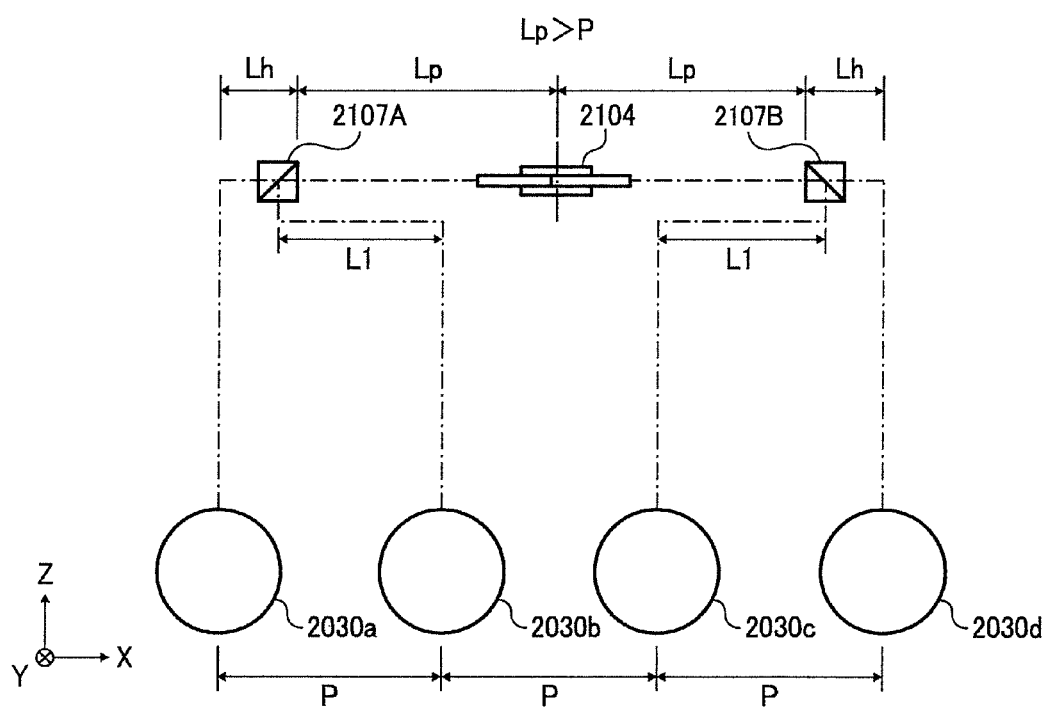
FIG. 17 is a first schematic diagram that explains a case where the distance between the rotation axis of the polygon mirror and the input surface of the polarized light splitter is longer than the distance between the axes of the plurality of the photosensitive elements.
Figure 18:
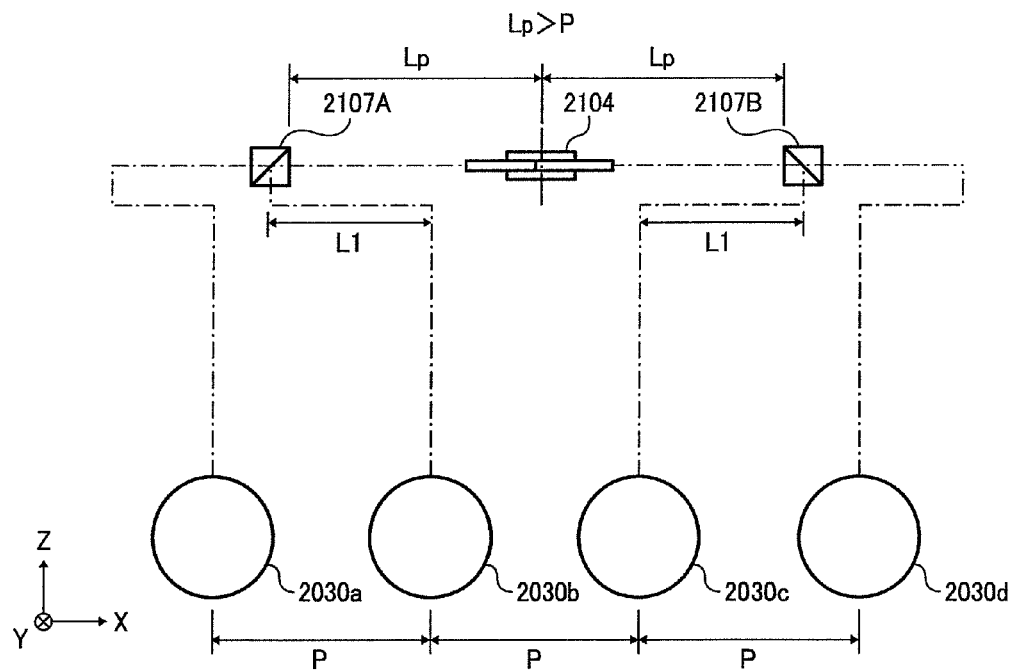
FIG. 18 is a second schematic diagram that explains the case where the distance between the rotation axis of the polygon mirror and the input surface of the polarized light splitter is longer than the distance between the axes of the plurality of the photosensitive elements.

In the example shown in FIG. 17, it is necessary to increase the portion Lh so as to set the lengths of the optical paths to equal. If the inter-axes distance P and the incident angle to the surface of each photosensitive element cannot be changed, the outside optical paths are bent outward, for example, as shown in FIG. 18. This configuration improves the degree of freedom in layout designing without increasing the thickness H of the optical scanning device.

In this example, because the distance between the deflector and the polarized-light splitter increases, the degree of freedom in arrangement of the deflector-side scanning lenses and the imaging-surface-side scanning lenses is improved. Therefore, it can be said that this configuration is preferable from the perspective of aberration correction, as well.

Because Lp is set longer than P in the present embodiment, the present embodiment is preferable from the perspective of improvement of the degree of freedom in layout designing.

A typical polarized light splitter can split incident light into two beams of linearly polarized light with the polarization directions perpendicular to each other. The "polarized-light splitting characteristic", hereinafter, is a characteristic of the polarized light splitter that splits, when receiving light containing two beams of linearly polarized light with the polarization directions perpendicular to each other (La and Lb), the light into light La' and light Lb' depending on the polarization directions.

If the amounts of the light La, Lb, La', and Lb' are A, B, A', and B', respectively, when the polarized light splitter has the ideal polarized-light splitting characteristic, then A is directly proportional to A' and B is directly proportional to B' and, accordingly, A' does not depend on B and B' dose not depend on A.

Figure 19:
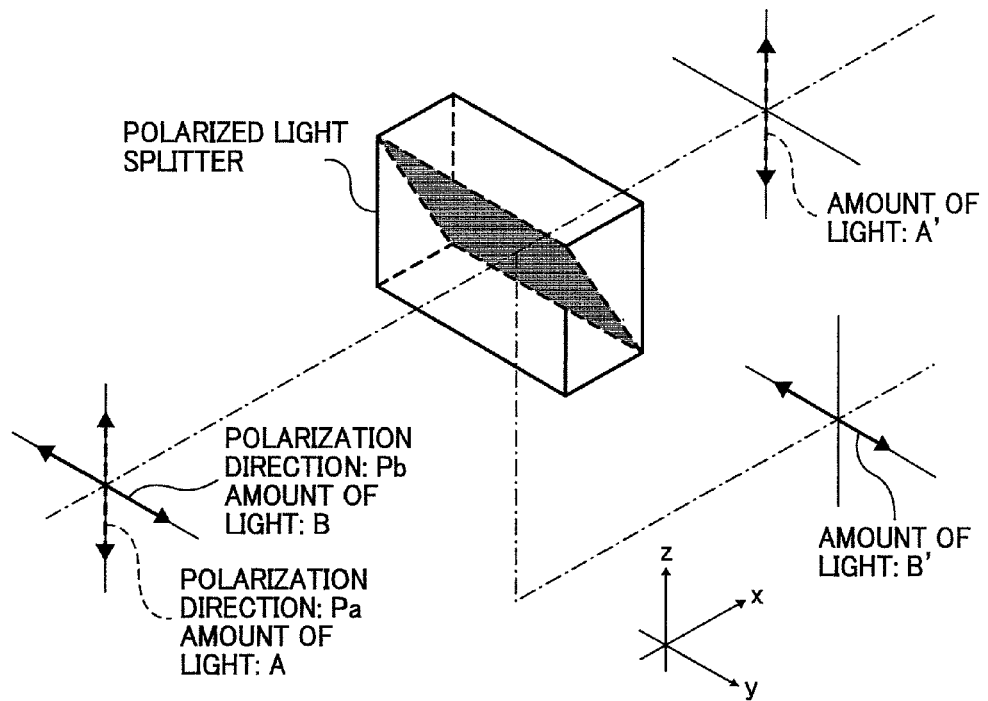
FIG. 19 is a schematic diagram that explains an ideal polarized-light splitting characteristic.

FIG. 19 is a functional schematic diagram of the polarized light splitter. The polarization direction of the light La is Pa, and the polarization direction of the light Lb is Pb. In this example, Pa is perpendicular to Pb, Pa is parallel to the z axis, and Pb is parallel to the y axis. The polarized light splitter with the ideal polarized-light splitting characteristic outputs the two beams of light on the different optical paths depending on the polarization directions perpendicular to each other.

Suppose there is a case where the light La and the light Lb have been passed through an element having birefringence. It is noted that "having birefringence" means that the refractive index, which affects the behavior of light, is different depending on the direction. From the perspective of the high production efficiency and the high moldability that allows a complicated surface shape, resin scanning lenses are widely used. The resin optical elements, in general, have birefringence and behave in the same manner as an optical anisotropy material.

As for an optical element made of resin using, for example, injection molding, if a part of resin polymers coagulate being aligning in the same orientation during the molding, an optical element is produced that has an optical anisotropic portion inside. When linearly polarized light enters the optical element, due to the basic characteristics of the optical anisotropic material, a phase difference occurs between cross sections perpendicular to each other and, therefore, the polarization direction rotates. In contrast, a glass optical element has a noncrystalline inner structure and is optically isotropic; therefore, the birefringence, which is observed in the resin optical element, does not occur.

Figure 20:
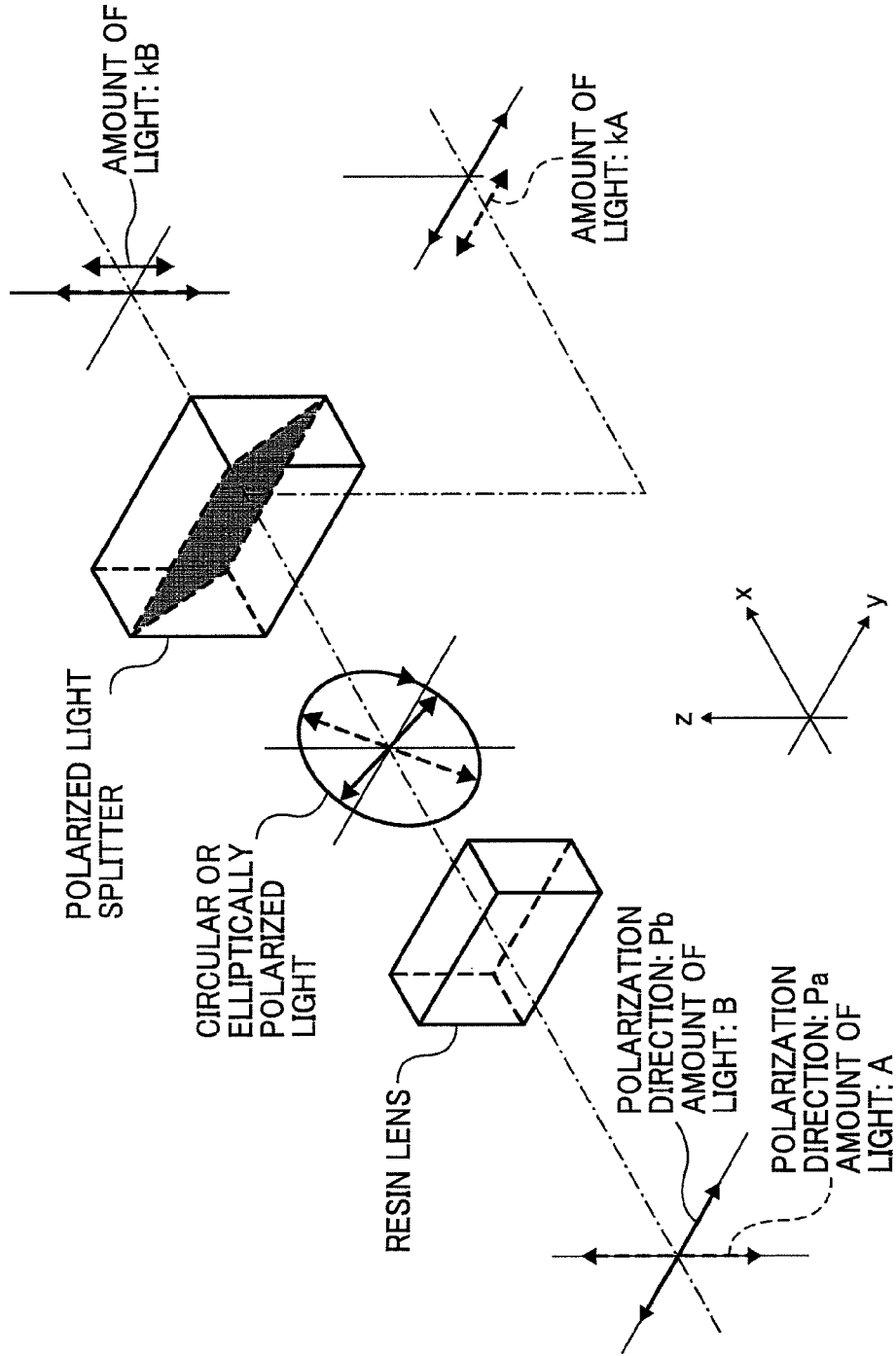
FIG. 20 is a schematic diagram that explains a case, after light has been passed through a resin lens with birefringence, the light enters the polarized light splitter.

As shown in FIG. 20, when the light La and the light Lb enter the resin lens with birefringence (hereinafter, "resin lens" in short), the polarization direction of the light rotates. By the effects of the birefringence, either linearly but differently polarized light or elliptically polarized light is then output. If the light having such a polarized state enters the polarized light splitter, the amounts A' and B' of beams of light output from the polarized light splitter become A'∝ (A+kB) and B'∝ (B+kA), respectively, (k is a proportionality coefficient), mixed with part of the other beam of light. This phenomenon is called, herein, "optical crosstalk", and the optical crosstalk represents degradation of the polarized-light splitting characteristic.

The birefringence of the resin lens is assumed due to backwater in resin flow during the injection molding process or uneven coagulation during the cooling process. The birefringence increases, as the thickness or the thickness variance increases. Therefore, a thin resin with a small thickness variance has relatively low birefringence.

However, it is difficult to correct an aberration on the surface to be scanned using one thin resin lens with a small thickness variance, and such a configuration may not satisfy the current needs for the high quality. On the other hand, if the number of necessary resin lenses increases, the polarized-light splitting characteristic decreases more by the effects of the increased birefringence.

The optical scanning device according to the present embodiment performs the polarized light split after light has passed through a lens made of glass (hereinafter, "glass lens") and a thin resin lens.

With this configuration, the optical scanning device obtains an excellent polarized-light splitting characteristic due to the isotopic glass lens and the thin resin lens with low birefringence and can correct an aberration due to a combination of the glass lens, which is difficult to form as a complicated shape, and the thin resin lens with high moldability.

The glass lens, which is difficult to form as a complicated shape or a large shape, is not suitable for the long optical element that affects each polygon-mirror deflected light going toward each image height. Therefore, the glass lens is, preferably, close to the polygon mirror than the resin lens is so that the glass lens roughly corrects the total aberration of the scanning light. Such an arrangement is effective to enhance the production efficiency of the glass lens, because a large glass lens is not needed.

In this case, an arrangement is coming up offhand that the resin lens is arranged downstream of the polarized light splitter. However, if the resin lens is arranged on each of the two optical paths of the beams of light split by the light polarized splitter, the freedom in the layout downstream of the light polarized splitter is limited, which makes it difficult to produce a slim optical scanning device.

Referring back to FIG. 4, after the light that is produced by coupling the light LBa and the light LBb is deflected by the polygon mirror 2104 toward the −X direction, the light enters the polarized-light splitter 2107A via the deflector-side scanning lens 2105A and the imaging-surface-side scanning lens 2106A.

The light LBa then passes through the polarized-light splitter 2107A and illuminates, via the reflecting mirrors 2108a and 2109a, the photosensitive element 2030a, thereby forming a light spot on the photosensitive element 2030a. The light spot moves in the longitudinal direction of the photosensitive element 2030a by the rotation of the polygon mirror 2104. In other words, the surface of the photosensitive element 2030a is scanned with the light spot. The moving direction of the light spot corresponds to the "main-scanning direction" on the photosensitive element 2030a. The rotating direction of the photosensitive element 2030a corresponds to the "sub-scanning direction" on the photosensitive element 2030a.

The light LBb is reflected by the splitting surface of the polarized-light splitter 2107A toward the −Z direction, and the reflected light LBb illuminates, via the reflecting mirrors 2108b and 2109b, the photosensitive element 2030b, thereby forming a light spot on the photosensitive element 2030b. The light spot moves in the longitudinal direction of the photosensitive element 2030b by the rotation of the polygon mirror 2104. In other words, the surface of the photosensitive element 2030b is scanned with the light spot. The moving direction of the light spot corresponds to the "main-scanning direction" on the photosensitive element 2030b. The rotating direction of the photosensitive element 2030b corresponds to the "sub-scanning direction" on the photosensitive element 2030b.

After the light that is produced by coupling the light LBc and the light LBd is deflected by the polygon mirror 2104 toward the +X direction, the light enters the polarized-light splitter 2107B via the deflector-side scanning lens 2105B and the imaging-surface-side scanning lens 2106B.

The light LBc is reflected by the splitting surface of the polarized-light splitter 2107B toward the −Z direction, and the reflected light LBc illuminates, via the reflecting mirrors 2108c and 2109d, the photosensitive element 2030c, thereby forming a light spot on the photosensitive element 2030c. The light spot moves in the longitudinal direction of the photosensitive element 2030c by the rotation of the polygon mirror 2104. In other words, the surface of the photosensitive element 2030c is scanned with the light spot. The moving direction of the light spot corresponds to the "main-scanning direction" on the photosensitive element 2030c. The rotating direction of the photosensitive element 2030c corresponds to the "sub-scanning direction" on the photosensitive element 2030c.

The light Lad passes through the polarized-light splitter 2107E and illuminates, via the reflecting mirrors 2108d and 2109d, the photosensitive element 2030d, thereby forming a light spot on the photosensitive element 2030d. The light spot moves in the longitudinal direction of the photosensitive element 2030d by the rotation of the polygon mirror 2104. In other words, the surface of the photosensitive element 2030d is scanned with the light spot. The moving direction of the light spot corresponds to the "main-scanning direction" on the photosensitive element 2030d. The rotating direction of the photosensitive element 2030d corresponds to the "sub-scanning direction" on the photosensitive element 2030d.

An optical system between the polygon mirror and each of the photosensitive elements on the optical path is called "optical scanning system". The optical scanning system according to the present embodiment includes the two deflector-side scanning lenses 2105A and 2105B; the two imaging-surface-side scanning lenses 2106A and 2106B; the two polarized-light splitters 2107A and 2107B; and the eight reflecting mirrors 2108a, 2108b, 2108c, 2108d, 2109a, 2109b, 2109c, and 2109d.

The optical scanning device that deflects light by the rotating polygon mirror and one-dimensionally scans the surface with the deflected light needs light guiding elements, such as mirrors, to evenly scan the plurality of the surfaces that are arranged in accordance with a predetermined positional relation.

A method (Drude theory) for measuring the complex refractive index of a metal is known that involves illuminating the metallic surface with linearly polarized light and measuring the ellipticity of the reflected polarized light. In general, when linearly polarized light enters a metallic surface at a certain angle, the light is reflected by the metallic surface as elliptically polarized light. Therefore, the arrangement of the light guiding elements upstream of the polarized light splitter decreases the polarized-light splitting characteristic. Accordingly, the light guiding elements are preferably arranged downstream of the polarized light splitter in the same manner as in the present embodiment.

Figure 21:
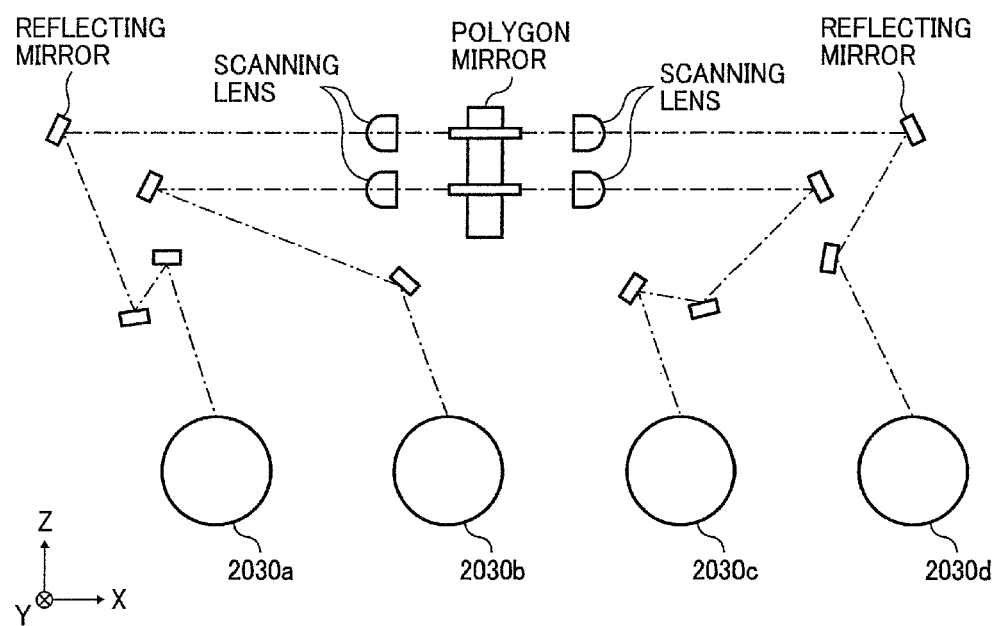
FIG. 21 is a schematic diagram of a conventional optical scanning device that includes a plurality of spatially separated optical scanning systems.

In a conventional multi-color image forming apparatus, one optical scanning device includes a plurality of spatially separated optical scanning systems (see FIG. 21). If the optical scanning device 2010 according to the present embodiment is used, the polarized-light splitting characteristic of the polarized light splitter is improved and occurrence of optical crosstalk is suppressed. Therefore, the optical scanning device 2010 can assign the image data corresponding to each surface to the light that is split depending on the polarization direction. This means that it is unnecessary to spatially separate the two beams of light going toward the different surfaces from each other and it is possible to reduce the size of an optical system that scans a plurality of surfaces. The size reduction of an optical system will allow production of a slim optical scanning device.

According to the present embodiment, the slim optical scanning device 2010 is produced that does not distort the polarized state of light entering the polarized light splitter and corrects an aberration in a preferable manner.

As described above, the optical scanning device 2010 according to the present embodiment includes, for example, the four light sources, the pre-deflector optical system, the polygon mirror 2104, and the optical scanning system.

The optical scanning system includes the deflector-side scanning lens made of glass, the imaging-surface-side scanning lens made of resin, the polarized light splitter, and the reflecting mirrors. The deflector-side scanning lens, the imaging-surface-side scanning lens, the polarized light splitter, and the reflecting mirrors are arranged in this order on the optical path from the polygon mirror 2104 to the photosensitive element. This configuration suppresses the distortion of the polarized state of the light entering the polarized light splitter and improves the polarized-light splitting characteristic as compared with the conventional configuration.

By suppressing the effects caused by birefringence of the imaging-surface-side scanning lens made of resin and preventing occurrence of stray light, although upper and lower layers are needed in the conventional optical scanning system, a single-layered optical scanning system can be used due to usage of the polarized light splitter. This reduces the number of lenses in the optical scanning system and decreases the thickness of the optical-system housing.

Accordingly, a slim optical scanning device can be produced at a low cost.

The thickness variance of the deflector-side scanning lens made of glass is larger than the thickness variance of the imaging-surface-side scanning lens made of resin. In this case, the degree of freedom in optical-system designing is sufficiently high.

The power of the deflector-side scanning lens made of glass is larger than the power of the imaging-surface-side scanning lens made of resin. In this case, an aberration on the surface to be scanned is corrected accurately.

The distance between the output surface of the deflector-side scanning lens made of glass and the input surface of the imaging-surface-side scanning lens made of resin is longer than the distance between the output surface of the imaging-surface-side scanning lens made of resin and the input surface of the polarized light splitter. In this case, because an aberration is corrected using a relatively large area for the light deflected by the polygon mirror, an aberration on the surface to be scanned is corrected accurately.

No light reflecting mirror is present on the optical path between the polygon mirror and the polarized light splitter. In this case, a decrease in the polarized-light splitting characteristic of the polarized light splitter is suppressed.

Birefringence of the resin lens is likely to occur on the boundary surface adjacent to the external. In the present embodiment, the length of the imaging-surface-side scanning lens made of resin in the main-scanning direction is equal to or longer than the length of the polarized light splitter in the main-scanning direction. In this case, because light does not pass through portions near the both edges of the imaging-surface-side scanning lens made of resin in the longitudinal direction, the light is not likely to be affected by birefringence.

The XZ cross section of each reflecting mirror is trapezoidal. In this case, vignetting due to light passed nearby and interference with the optical-system housing are prevented. This configuration is effective to not only prevention of light vignetting but also decrease in the thickness of the optical-system housing.

The length of the optical path from the rotation axis of the polygon mirror to the input surface of the polarized light splitter is longer than the inter-axes distance between the axes of the adjacent photosensitive elements. In this case, the degree of freedom in layout designing increases.

The pre-deflector optical system includes a diffraction lens. In this case, it is possible to make a temperature adjustment.

Both of the input surface and the output surface of the deflector-side scanning lens made of glass are rotationally symmetric spheres. The imaging-surface-side scanning lens made of resin has an anamorphic surface and a surface that is designed in such a manner that if an imaginary line is drawn by joining together the centers of curvature in the sub-scanning direction, the imaginary line is not a straight line on a main-scanning plane. In this case, it is possible to form a small light spot on the surface to be scanned in a simple manner.

According to the present embodiment, a highly stable optical scanning device is produced without increasing the number of necessary parts. Therefore, it is unnecessary to increase the amount of materials necessary to produce the optical scanning device and, in turn, it is possible to suppress an increase in a load on the environment from the perspective of the mining amount of natural resources and the amount of plastic-refuse emission.

Moreover, the color printer 2000 according to the present embodiment includes the optical scanning device 2010; therefore, the size reduction can be implemented at a low cost.

In general, between the photosensitive elements and the optical scanning device, there are arranged image forming units (denoted with 2K, 2M, 2C, and 2Y shown in FIG. 1) for color-based developing, charging, cleaning of the photosensitive elements, and storing therein usable toners or waste toners. If the thickness of the optical scanning device decreases while the size of the image forming apparatus is unchanged, the space for the image forming units inside the image forming apparatus increases. A larger storage for toners can be used and the rate of the toner replacement by the user will decrease when compared with the rate of the toner replacement in a conventional one. The photosensitive element, which is subjected to various operations over and over, such as the exposure, the development, and the cleaning, can be replaced with a larger one with an expectation for the durability. Due to a decrease in the thickness of the optical scanning device, the user will become free from the frequent maintenances and the frequent toner replacement and the "user-friendliness" is improved.

Figure 22:
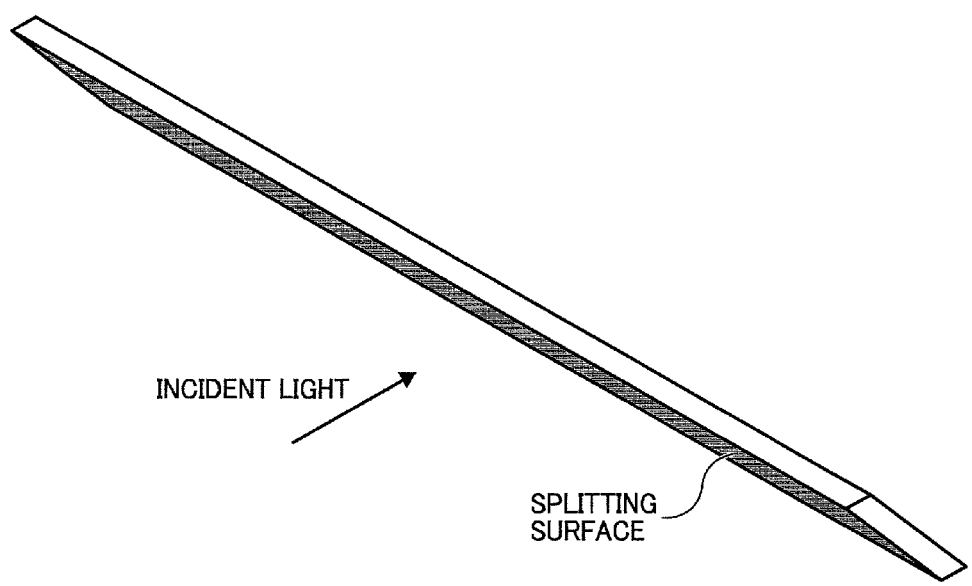
FIG. 22 is a schematic diagram of a first modulation of the polarized light splitter.
Figure 23:
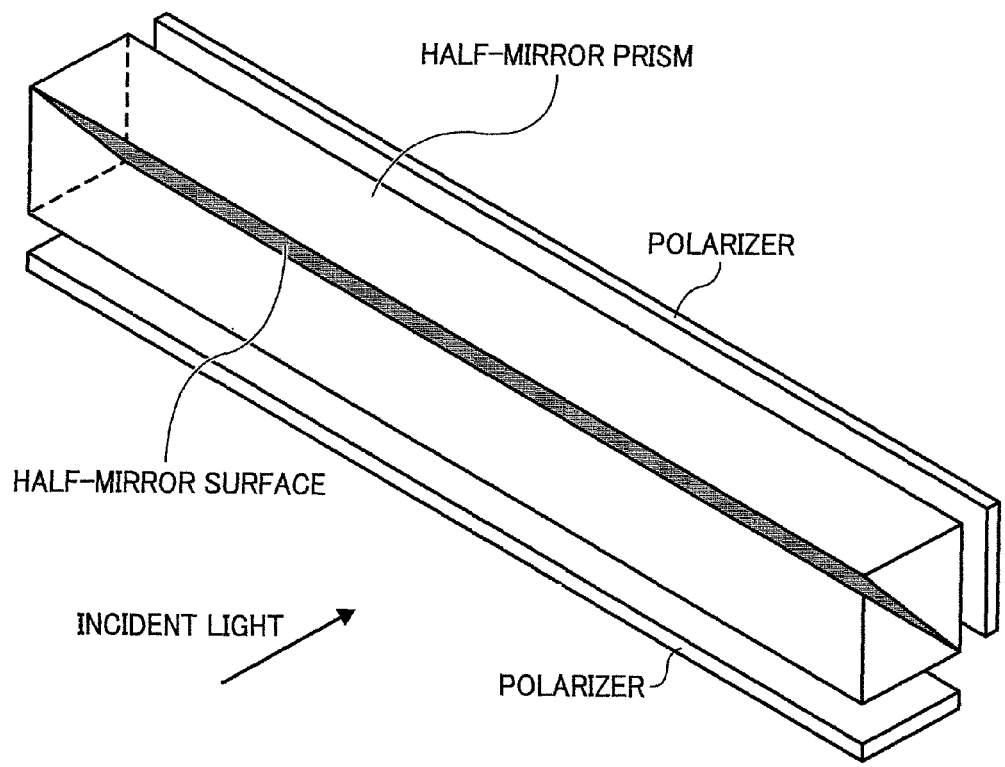
FIG. 23 is a schematic diagram of a second modulation of the polarized light splitter.

Although, in the above embodiment, each polarized light splitter is produced by joining two long triangular prisms together with their dielectric multilayer sides being bonded to each other, the configuration is not limited thereto. For example, as shown in FIG. 22, it is allowable to use a long parallel plate made of resin having one side that works as the splitting surface. The splitting surface can be a wire grid surface with nano-level thin metallic lines running all over in a regular manner. The wire grid pattern is designed in accordance with the necessary polarized light splitting characteristic. As shown in FIG. 23, for example, each polarized light splitter can include a long half-mirror prism made of resin and two polarizers with their transmission axes perpendicular to each other arranged on the optical paths of the beams of light split by the half-mirror prism.

Moreover, although, in the above embodiment, the diffraction surface of the diffraction lens is multi-step shaped, the configuration is not limited thereto. It is noted that it is difficult to process/mold the diffraction surface to Fresnel-lens shaped.

Furthermore, although, in the above embodiment, each light source includes an edge-lighting element as a light-emitting element, the configuration is not limited thereto. Each light source can include a vertical-cavity surface-emitting laser element.

Moreover, although, in the above embodiment, each light source includes one light-emitting unit, each light source can include a plurality of light-emitting units.

Furthermore, in the above embodiment, the direct transfer can be used, i.e., a toner image can be transferred from the photosensitive element directly onto a recording sheet.

Moreover, although, in the above embodiment, an image carrier is drum shaped, the configuration is not limited thereto. The image carrier can be sheet shaped or belt shaped. For example, a sheet of zinc oxide paper can be used as a sheet-shaped photoconductive element.

Furthermore, although, in the above embodiment, the color printer 2000 is used as the image forming apparatus, some other devices can be used instead, such as an optical plotter or a digital copier.

Moreover, an image forming apparatus that uses a silver salt film can be used as an image carrier. In this case, a latent image is formed on the silver salt film by the optical scanning and the latent image is developed into a visible image in the process the same as the typical silver-halide photography developing process. The visible image is then transferred to a sheet of printing paper in the process the same as the typical silver-halide photography printing process. Such an image forming apparatus can be used as an optical platemaker or a lithographic machine that draws a CT scan image, etc.

Furthermore, an image forming apparatus that uses a chromogenic medium that colors due to thermal energy caused by a beam spot (positive printing paper) can be used as an image carrier. In this case, a visible image is formed on the image carrier directly by the optical scanning.

As long as an image forming apparatus that includes the above-described optical scanning device 2010, the size reduction is implemented at a low cost.

As described above, the optical scanning device according to the present invention is produced at a low cost but suitable for scanning a plurality of surfaces accurately. Moreover, the image forming apparatus according to the present invention is produced at a low cost but suitable for forming high-quality images.

This makes it possible to produce a slim optical scanning device at a low cost.

By using an optical scanning device according to the present invention in an image forming apparatus, a slim image forming apparatus can be produced at a low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that deflects, by using a deflector, a first beam of light polarized in a given direction and a second beam of light polarized in a direction perpendicular to the given direction and guides each of the first beam of light and the second beam of light to a corresponding surface to be scanned by using an optical scanning system so that each light forms an image on the corresponding surface, wherein the optical scanning system includes:
   a first scanning lens that is arranged on an optical path along which light travels after being deflected by the deflector, wherein the first scanning lens is made of glass;
   a second scanning lens that is arranged on an optical path along which light travels after passing through the first scanning lens, wherein the second scanning lens is made of resin; and
   a polarized light splitter that is arranged on an optical path along which light travels after passing through the second scanning lens, wherein the polarized light splitter allows the first beam of light to pass therethrough and reflects the second beam of light,
   wherein a distance between a light output surface of the first scanning lens and a light input surface of the second scanning lens is longer than a distance between a light output surface of the second scanning lens and a light input surface of the polarized light splitter.

2. The optical scanning device according to claim 1, wherein a difference between the largest thickness and the smallest thickness of the first scanning lens is larger than a difference between the largest thickness and the smallest thickness of the second scanning lens, wherein the thickness of the first scanning lens is a length in a direction perpendicular to a longitudinal direction of the first scanning lens, and the thickness of the second scanning lens is a length in a direction perpendicular to a longitudinal direction of the second scanning lens.

3. The optical scanning device according to claim 2, wherein, for a cross-section perpendicular to a rotation axis of the deflector, power of the first scanning lens is larger than power of the second scanning lens.

4. The optical scanning device according to claim 1, wherein the optical scanning system further includes at least one light guiding element that reflects at least one of the first beam of light and the second beam of light, and the light guiding element is arranged on an optical path between the corresponding surface to be scanned and the polarized light splitter.

5. The optical scanning device according to claim 4, wherein a cross section of the light guiding element perpendicular to the main-scanning direction is a trapezoid.

6. The optical scanning device according to claim 1, wherein both a surface to be scanned with the first beam of light and a surface to be scanned with the second beam of light are surfaces of tubular members, and a distance between a rotation axis of the deflector and a light input surface of the polarized light splitter is longer than a distance between axes of the two tubular elements.

7. The optical scanning device according to claim 1, wherein both the first beam of light and the second beam of light enter the deflector via an input optical system, and the input optical system includes a diffractive optical element.

8. The optical scanning device according to claim 1, wherein both of an input surface and an output surface of the first scanning lens are rotationally symmetric spheres, and the second scanning lens has an anamorphic surface on at least one of an input surface and an output surface thereof and also has a surface designed in such a manner that, if an imaginary line is drawn by joining together centers of curvature of a plurality of cross sections perpendicular to a main-scanning direction, the imaginary line is not a straight line on a plane perpendicular to a rotation axis of the deflector.

9. An image forming apparatus comprising: a plurality of image carriers; and the optical scanning device according to claim 1 that scans the image carriers with light modulated in accordance with image data.

10. An optical scanning device that deflects, by using a deflector, a first beam of light polarized in a given direction and a second beam of light polarized in a direction perpendicular to the given direction and guides each of the first beam of light and the second beam of light to a corresponding surface to be scanned by using an optical scanning system so that each light forms an image on the corresponding surface, wherein the optical scanning system includes:
   a first scanning lens that is arranged on an optical path along which light travels after being deflected by the deflector, wherein the first scanning lens is made of glass;
   a second scanning lens that is arranged on an optical path along which light travels after passing through the first scanning lens, wherein the second scanning lens is made of resin; and
   a polarized light splitter that is arranged on an optical path along which light travels after passing through the second scanning lens, wherein the polarized light splitter allows the first beam of light to pass therethrough and reflects the second beam of light, wherein a length of the second scanning lens in the longitudinal direction is longer than a length of the polarized light splitter in the longitudinal direction.

11. The optical scanning device according to claim 10, wherein a difference between the largest thickness and the smallest thickness of the first scanning lens is larger than a difference between the largest thickness and the smallest thickness of the second scanning lens, wherein the thickness of the first scanning lens is a length in a direction perpendicular to a longitudinal direction of the first scanning lens, and the thickness of the second scanning lens is a length in a direction perpendicular to a longitudinal direction of the second scanning lens.

12. The optical scanning device according to claim 11, wherein, for a cross-section perpendicular to a rotation axis of the deflector, power of the first scanning lens is larger than power of the second scanning lens.

13. The optical scanning device according to claim 10, wherein the optical scanning system further includes at least one light guiding element that reflects at least one of the first beam of light and the second beam of light, and the light guiding element is arranged on an optical path between the corresponding surface to be scanned and the polarized light splitter.

14. The optical scanning device according to claim 13, wherein a cross section of the light guiding element perpendicular to the main-scanning direction is a trapezoid.

15. The optical scanning device according to claim 10, wherein both a surface to be scanned with the first beam of light and a surface to be scanned with the second beam of light are surfaces of tubular members, and a distance between a rotation axis of the deflector and a light input surface of the polarized light splitter is longer than a distance between axes of the two tubular elements.

16. The optical scanning device according to claim 10, wherein both the first beam of light and the second beam of light enter the deflector via an input optical system, and the input optical system includes a diffractive optical element.

17. The optical scanning device according to claim 10, wherein both of an input surface and an output surface of the first scanning lens are rotationally symmetric spheres, and the second scanning lens has an anamorphic surface on at least one of an input surface and an output surface thereof and also has a surface designed in such a manner that, if an imaginary line is drawn by joining together centers of curvature of a plurality of cross sections perpendicular to a main-scanning direction, the imaginary line is not a straight line on a plane perpendicular to a rotation axis of the deflector.

18. An image forming apparatus comprising: a plurality of image carriers; and the optical scanning device according to claim 10 that scans the image carriers with light modulated in accordance with image data.

\* \* \* \* \*